US 11,117,433 B2

(12) United States Patent
Johnson et al.

(10) Patent No.: US 11,117,433 B2
(45) Date of Patent: Sep. 14, 2021

(54) INTEGRATED BAR-PIN CLEVIS JOINT CONNECTION

(71) Applicant: SAF-HOLLAND, Inc., Muskegon, MI (US)

(72) Inventors: Marc Johnson, Muskegon, MI (US); Jeffrey Galla, Muskegon, MI (US); Richard Conaway, Grand Haven, MI (US)

(73) Assignee: SAF-HOLLAND, Inc., Muskegon, MI (US)

( * ) Notice: Subject to any disclaimer, the term of this patent is extended or adjusted under 35 U.S.C. 154(b) by 149 days.

(21) Appl. No.: 16/272,530

(22) Filed: Feb. 11, 2019

(65) Prior Publication Data

US 2019/0248201 A1 Aug. 15, 2019

Related U.S. Application Data

(60) Provisional application No. 62/631,162, filed on Feb. 15, 2018.

(51) Int. Cl.
*B60G 7/02* (2006.01)
*B60G 7/00* (2006.01)
(Continued)

(52) U.S. Cl.
CPC .............. *B60G 7/02* (2013.01); *B60G 3/185* (2013.01); *B60G 5/04* (2013.01); *B60G 7/001* (2013.01);
(Continued)

(58) Field of Classification Search
CPC .......... B60G 7/02; B60G 3/185; B60G 7/001; B60G 11/27; B60G 5/04;
(Continued)

(56) References Cited

U.S. PATENT DOCUMENTS 2,147,080 A * 2/1939 Barrett .................... F16B 21/10
411/347
3,325,181 A * 6/1967 Olegranning ........ B62D 61/125
280/43.23
(Continued)

FOREIGN PATENT DOCUMENTS

DE 3730176 A1 3/1989
EP 0230485 A1 8/1987

*Primary Examiner* — Frank B Vanaman
(74) *Attorney, Agent, or Firm* — Price Heneveld LLP

(57) ABSTRACT

A vehicle suspension arrangement includes a mounting bracket, a trailing arm, an air spring assembly configured to bias a second end of the trailing arm from a vehicle frame member, an axle assembly couple to the trailing arm, and a trailing arm connection assembly that includes a connector having a first portion received within an aperture of the mounting bracket, and a second portion extending outwardly from the first portion and including an aperture, a bushing member received within a first end of the trailing arm, a pin member received within the bushing member and including a first aperture, and a first mechanical fastener received within the first aperture of the pin member and within the aperture of the second portion of the first connector, thereby pivotably securing the trailing arm to the mounting bracket.

29 Claims, 4 Drawing Sheets

(51) Int. Cl.
    *B60G 11/27*      (2006.01)
    *B60G 5/04*      (2006.01)
    *B60G 3/18*      (2006.01)

(52) U.S. Cl.
    CPC ........ *B60G 11/27* (2013.01); *B60G 2204/143* (2013.01); *B60G 2204/41* (2013.01); *B60G 2204/4302* (2013.01); *B60G 2206/8201* (2013.01); *B60G 2300/042* (2013.01)

(58) Field of Classification Search
    CPC ........ B60G 2204/4302; B60G 2204/41; B60G 2206/8201; B60G 2204/143; B60G 2206/601; B60G 2206/8207; B60G 2200/314; B60G 2300/042; F16B 21/10
    See application file for complete search history.

(56) References Cited

U.S. PATENT DOCUMENTS

| | | | |
|---|---|---|---|
| 3,482,854 A * | 12/1969 | Masser | B60G 7/02 280/86.75 |
| 3,960,388 A | 6/1976 | Strader et al. | |
| 4,261,597 A | 4/1981 | Vandenberg | |
| 4,595,216 A | 6/1986 | Ware | |
| 4,991,868 A | 2/1991 | Vandenberg | |
| 5,201,898 A | 4/1993 | Pierce | |
| 5,390,955 A * | 2/1995 | Kaliszewski | B62D 1/195 280/777 |
| 5,403,031 A * | 4/1995 | Gottschalk | B60G 9/02 280/86.5 |
| 5,775,719 A | 7/1998 | Holden | |
| 5,979,860 A * | 11/1999 | Jurik | B62D 1/195 188/371 |
| 5,988,614 A * | 11/1999 | Sturmon | B60G 11/12 267/292 |
| 6,131,930 A | 10/2000 | Chalin | |
| 6,409,189 B1 | 6/2002 | Orimoto et al. | |
| 6,550,795 B1 | 4/2003 | Schlosser et al. | |
| 6,659,479 B1 | 12/2003 | Raidel, II et al. | |
| 7,296,809 B2 | 11/2007 | Zebolsky | |
| 2003/0107198 A1* | 6/2003 | VanDenberg | B60G 9/022 280/86.5 |
| 2007/0176385 A1* | 8/2007 | Barton | B60G 9/00 280/124.116 |
| 2016/0059653 A1 | 3/2016 | Gan et al. | |

* cited by examiner

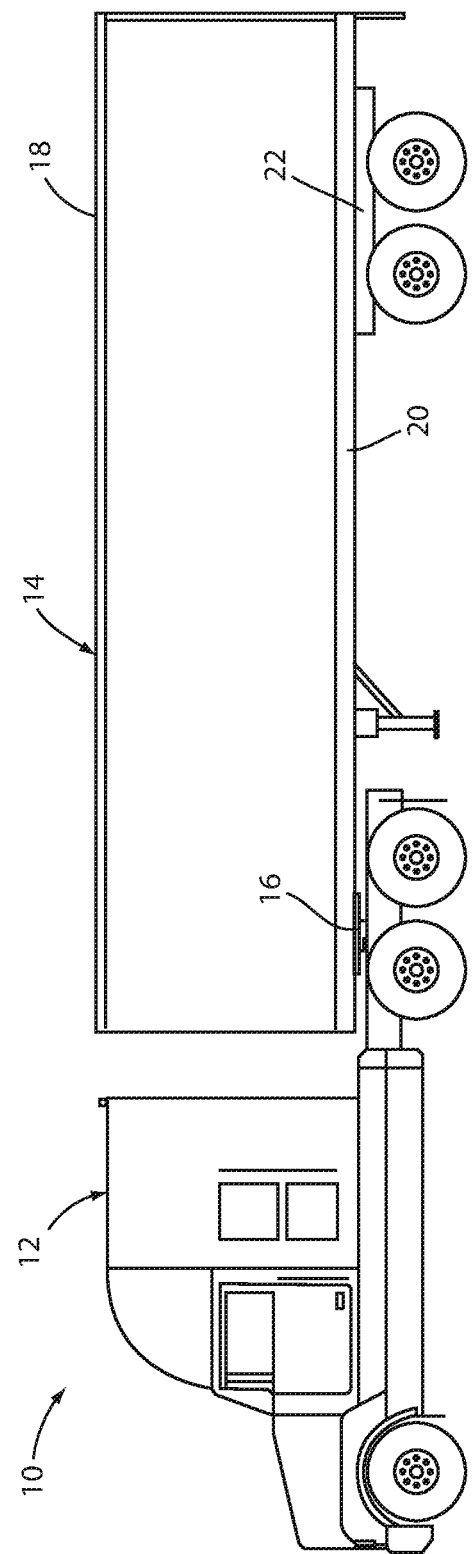
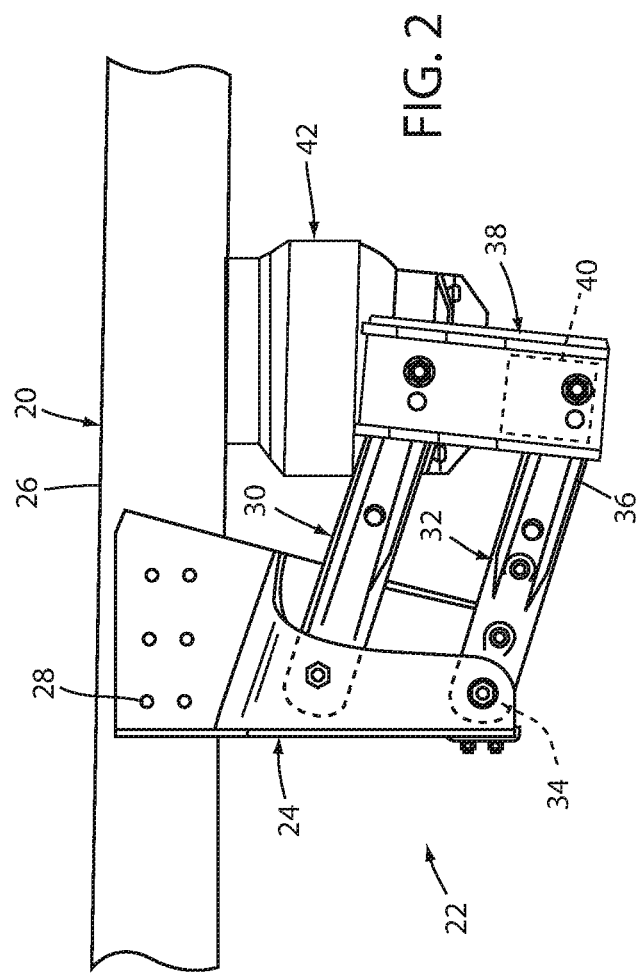

INTEGRATED BAR-PIN CLEVIS JOINT CONNECTION

BACKGROUND OF THE INVENTION

The embodiments as disclosed herein relate to a vehicle suspension arrangement, and in particular to a vehicle suspension arrangement for a heavy duty, commercial-type vehicle that includes a trailing arm-type suspension arrangement, where the suspension arrangement includes a trailing arm connection assembly providing a connection between the trailing arm and the other elements of the suspension assembly.

BRIEF SUMMARY

One embodiment includes a vehicle suspension arrangement that includes a mounting bracket configured to be secured to a vehicle frame member, a trailing arm having a first end and a second end, an air spring assembly configured to bias the second end of the trailing arm from the vehicle frame member, an axle assembly coupled to the trailing arm along a length thereof, and a trailing arm connection assembly pivotably coupling the first end of the of the trailing arm to the mounting bracket. The first trailing arm connection assembly includes a first connector having a first portion received within a first aperture of the mounting bracket, and a second portion extending outwardly from the first portion and including an aperture, a bushing member received within the first end of the trailing arm, a pin member received within the bushing member and including a first aperture, and a first mechanical fastener received within the first aperture of the pin member and within the aperture of the second portion of the first connector, thereby pivotably securing the trailing arm to the mounting bracket.

Another embodiment includes a vehicle suspension arrangement that includes a mounting bracket configured to be secured to a vehicle frame member, a trailing arm having a first end and a second end, an air spring assembly configured to bias the second end of the trailing arm from the vehicle frame member, an axle assembly coupled to the trailing arm along a length thereof, and a trailing arm connection assembly pivotably coupling the first end of the of the trailing arm to the mounting bracket. The first trailing arm connection assembly includes a first connector having a cylindrically-shaped first portion received within a first aperture of the mounting bracket, and a second portion extending outwardly from the first portion and including an aperture, a second connector having a cylindrically-shaped first portion received within a second aperture of the mounting bracket, and a second portion extending outwardly from the first portion of the second connector and including an aperture, and a bushing member received within the first end of the trailing arm. The first trailing arm connection assembly further includes a pin member received within the bushing member and including a first aperture located proximate a first end of the pin member and a second aperture located proximate a second end of the pin member, and a first mechanical fastener received within the first aperture of the pin member and within the aperture of the second portion of the first connector, and a second mechanical fastener received within the second aperture of the pin member and within the aperture of the second portion of the second connector, thereby pivotably securing the trailing arm to the mounting bracket.

Yet another embodiment includes a connector member configured to pivotably couple a trailing arm to a mounting bracket of a heavy duty vehicle suspension arrangement that includes a cylindrically-shaped first portion configured to be received within an aperture of a mounting bracket, the first portion including a longitudinally extending bore, an arm portion extending in an axial direction from the first portion and including an aperture configured to receive a mechanical fastener therein, and at least one tab member extending radially outward from the first portion, wherein the at least one tab member is configured to be received within a notch of the aperture of the mounting bracket thereby preventing misalignment of the connector member with the mounting bracket.

The embodiments of the vehicle suspension arrangement as shown and described herein provide a relatively uncomplicated design for connecting a trailing arm of the suspension arrangement with other elements of the suspension arrangement, may be easily and quickly assembled without the use of specialized tools, is economical to manufacture, is capable of being used across various suspension platforms, is capable of a long operating life, and is particularly well adapted for the proposed use.

These and other features, advantages, and objects of the present invention will be further understood and appreciated by those skilled in the art by reference to the following written specification, claims, and appended drawings.

BRIEF DESCRIPTION OF THE DRAWINGS

FIG. 1 is a schematic elevational side view of a vehicle arrangement, including a semi-tractor and a heavy-duty, commercial-type trailer;

FIG. 2 is a side elevational view of a suspension system of the vehicle arrangement;

DETAILED DESCRIPTION OF THE PREFERRED EMBODIMENTS

Figure 4:
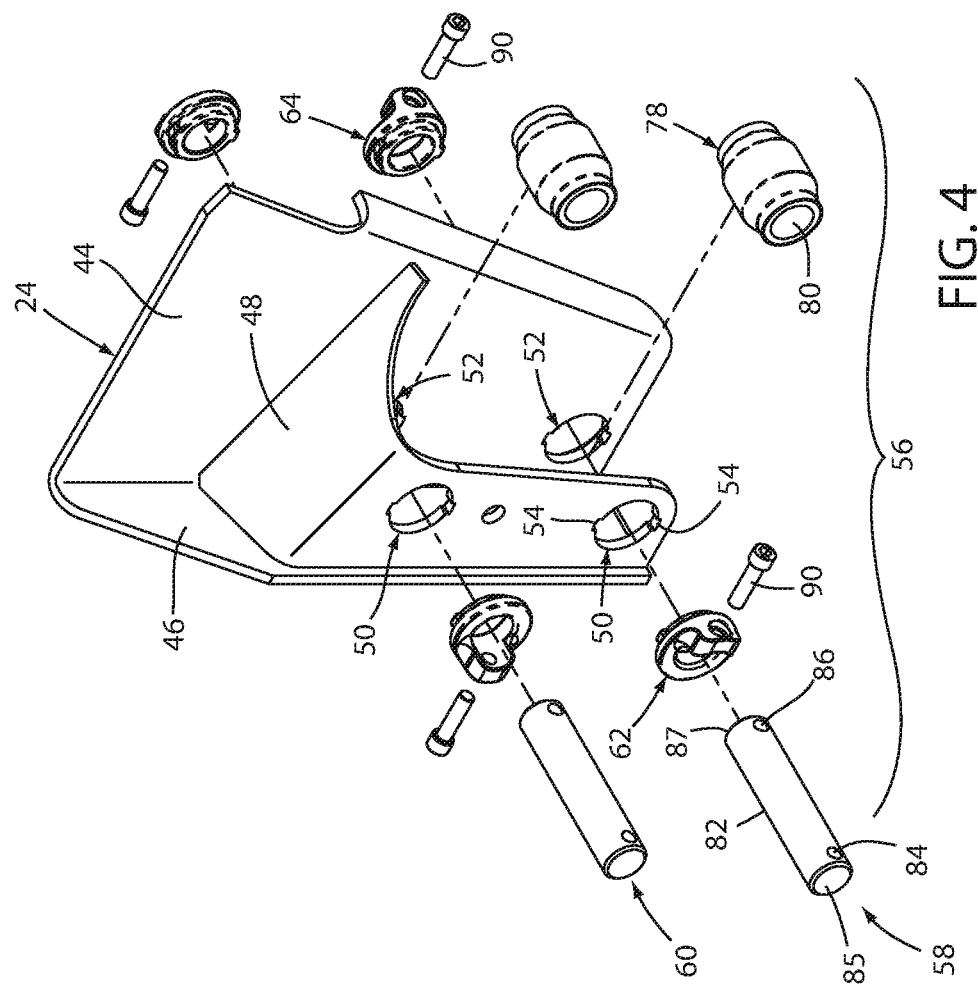
FIG. 4 is an exploded perspective view of the mounting bracket and the trailing arm connection assembly.

For purposes of description herein, the terms "upper," "lower," "right," "left," "rear," "front," "vertical," "horizontal," and the embodiments thereof shall relate to the embodiment as oriented in FIGS. 1 and 2. However, it is to be understood that the various embodiments as shown and described herein may assume various alternative orientations, except where expressly specified to the contrary. It is also to be understood that the specific devices and processes illustrated in the attached drawings, and described in the following specification are simply exemplary embodiments of the concepts defined in the appended claims. Hence, specific dimensions and other characteristics relating to the embodiments disclosed herein are not to be considered as limiting, unless the claims expressly state otherwise.

The reference numeral 10 (FIG. 1) generally designates a heavy-duty tractor and trailer combination, wherein a semitruck or tractor 12 operably supports an associated trailer 14 via a fifth wheel hitch assembly 16 in a manner as well known in the art.

The trailer 14 includes a trailer body 18 supported by a trailer frame assembly 20 in turn supported by a trailer suspension arrangement 22. As best illustrated in FIG. 2, the trailer suspension arrangement includes a mounting bracket 24 fixedly coupled to a frame member 26 of the trailer frame assembly 20 by a plurality of mechanical fasteners such as bolts 28. The trailer suspension arrangement 22 further includes a pair of trailing arms including an upper trailing arm 30 and a lower trailing arm 32 each having a first end 34 pivotably coupled to the mounting bracket 24 as described below, and a second end 36. The trailer suspension arrangement 22 further includes an axle assembly 38 that includes an axle member 40 coupled to the trailing arms 30, 32 along a length of each, and an air spring assembly 42 positioned between the second end 36 of each of the trailing arms 30, 32 and the frame member 26 to bias the axle member 40 from the frame member 26.

As best illustrated in FIGS. 3-6, the mounting bracket 24 includes a body portion 44, a flange portion 46 extending outwardly from the body portion 44 and a mounting flange 48 extending between the body portion 44 and the flange portion 46. A pair of apertures 50 extends through the mounting flange 48 while a pair of apertures 52 extends through the body portion 44. The apertures 50 are paired and axially aligned with the apertures 52. Each of the apertures 50, 52 have a circular shape and include a pair of alignment notches located on opposite sides of the respective aperture 50, 52.

Figure 7:
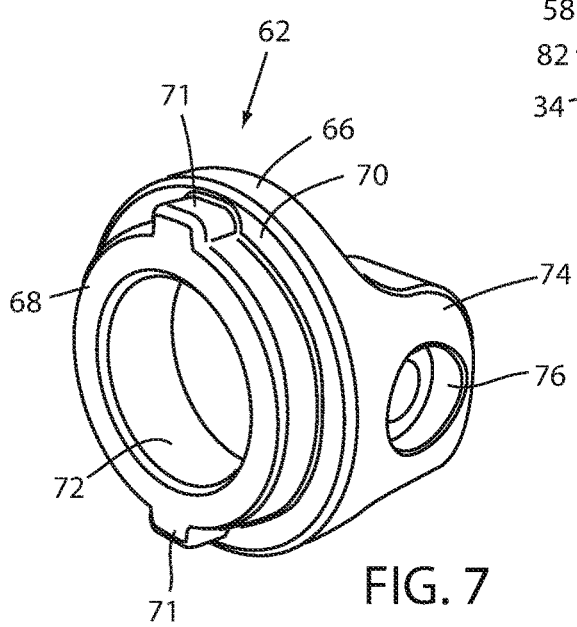
FIG. 7 is a perspective view of a connector of the trailing arm connection assembly.
Figure 8:
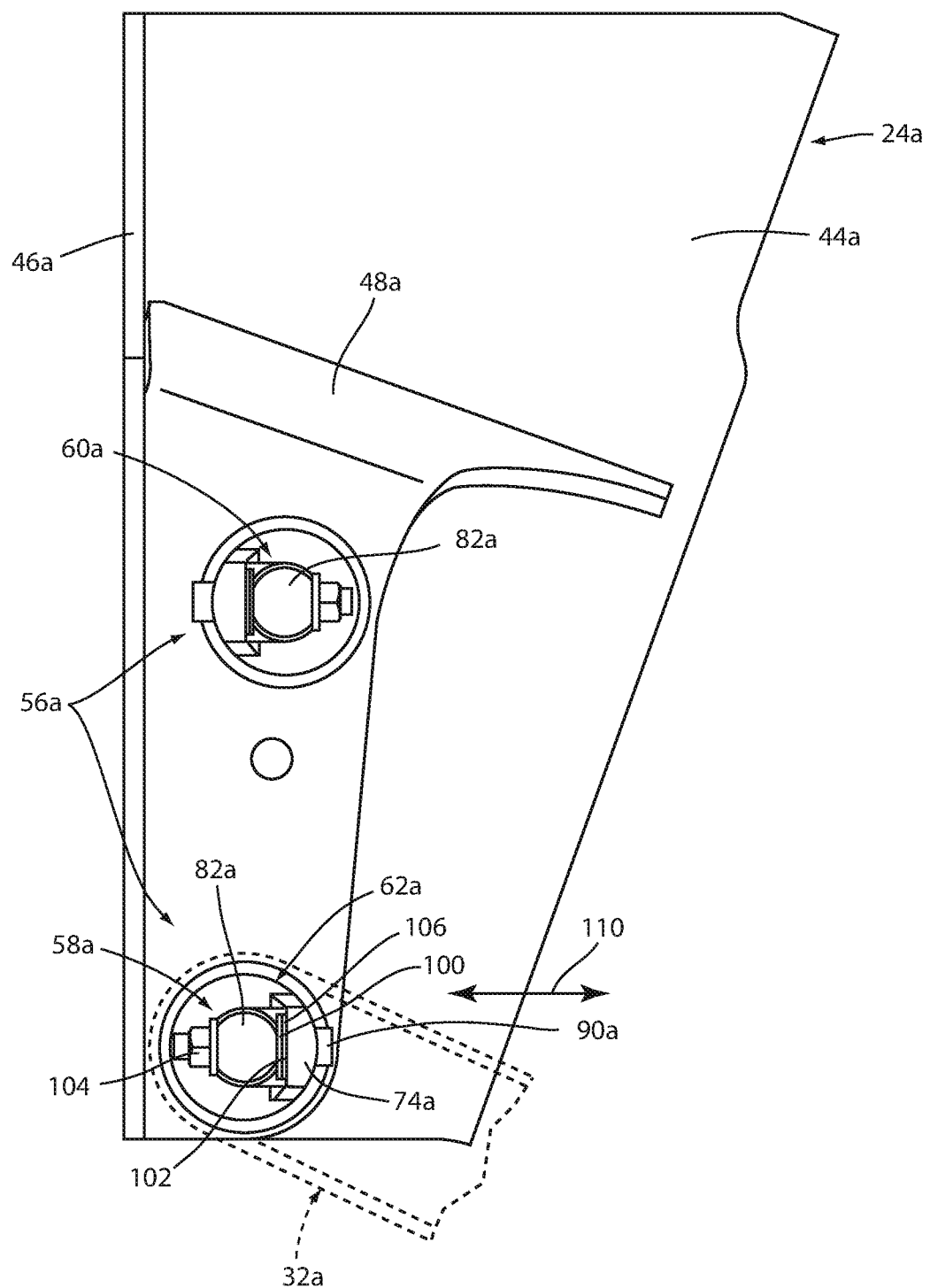
FIG. 8 is a side elevational view of the mounting bracket and the trailing arm connection assembly showing internal components thereof.

The trailer suspension arrangement 22 further includes a trailing arm connection assembly 56 that includes a lower trailing arm connection assembly 58 and an upper trailing arm connection assembly 60 that pivotably couple to the lower trailing arm 32 and the upper trailing arm 30 to the mounting bracket 24, respectively. As the lower trailing arm assembly 58 and the upper trailing arm connection assembly 60 are relatively similar in configuration, only the lower trailing arm connection assembly 58 is described in detail herein. The lower trailing arm connection assembly 58 includes a pair of connectors including a first connector 62 and a second connector 64. As each of the connectors 62, 64 are similar in construction and configuration only the first connector 62 is described in detail herein. The connector 62 (FIG. 7) includes a cylindrically-shaped body portion 66, a cylindrically-shaped insert portion 68 inwardly offset from the body portion 66, wherein a bottom wall 70 of the body portion 66 extends between the body portion 66 and the insert portion 68. The first connector 62 further includes a pair of alignment tabs 71 extending radially outward from the insert portion 68. An aperture or bore 72 extends through the body portion 66 and the insert portion 68. The connector 62 further includes an arm portion 74 extending radially outward from the body portion 66. The arm portion 74 includes an aperture 76 extending therethrough.

The lower trailing arm connection assembly 58 further includes an elastomeric bushing member 78 having a central aperture 80, and a pin member 82 having a first aperture 84 located proximate a first end 85 and a second aperture 86 located proximate a second end 87.

Figure 3:
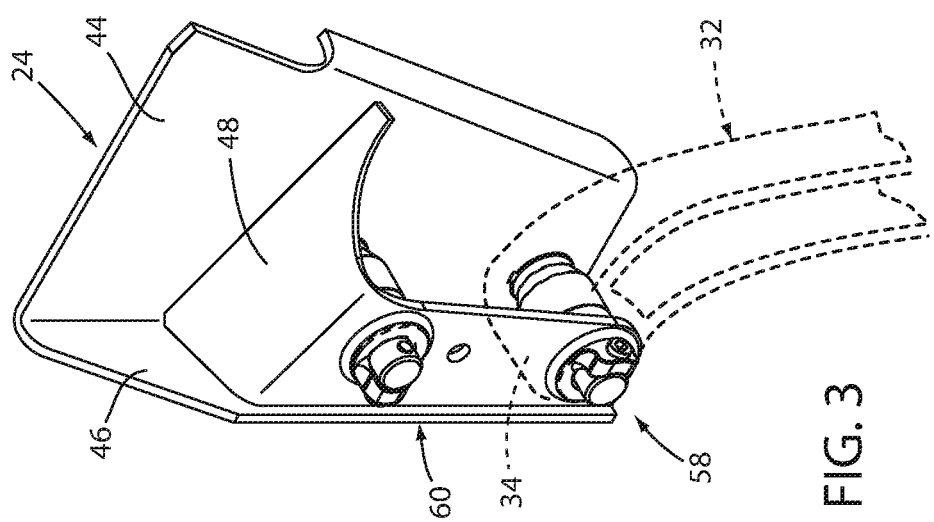
FIG. 3 is a perspective view of a mounting bracket and a trailing arm connection assembly of the suspension arrangement.
Figure 5:
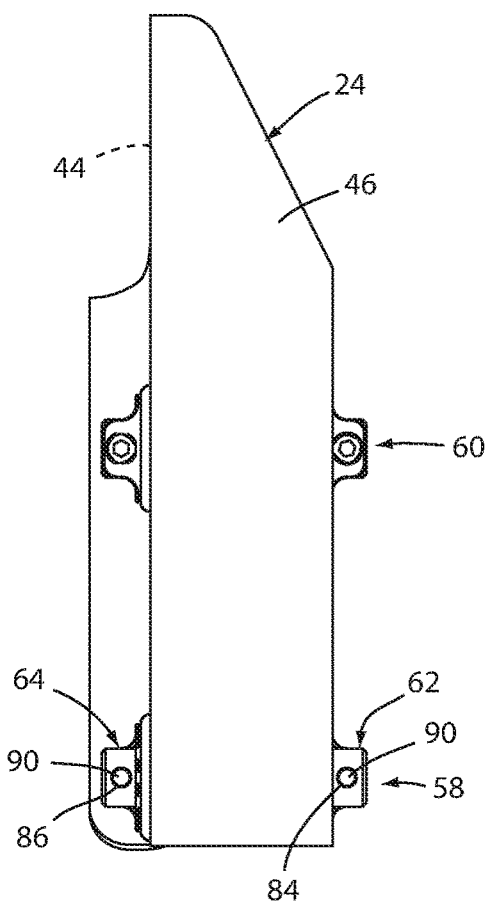
FIG. 5 is an end view of the mounting bracket and the trailing arm connection assembly.
Figure 6:
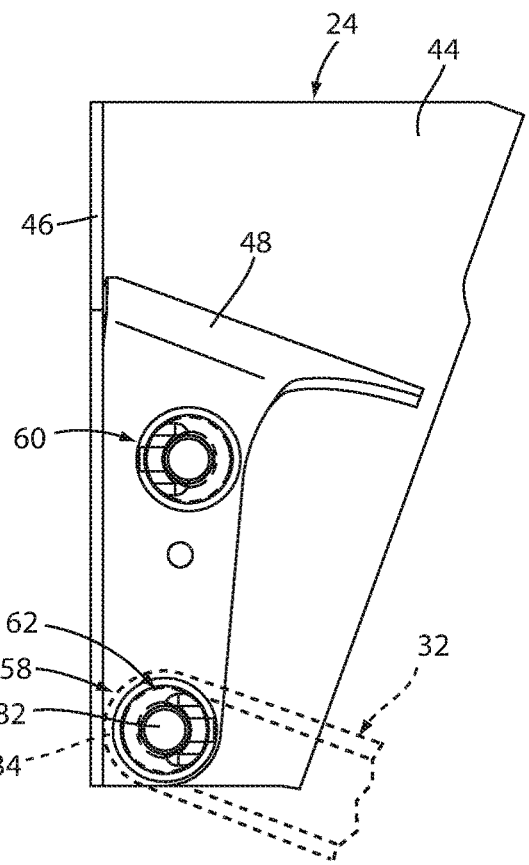
FIG. 6 is a side elevational view of the mounting bracket and the trailing arm connection assembly.

In assembly the first and second connectors 62, 64 are aligned with and inserted into the corresponding apertures 50, 52 of the mounting bracket 24, such that the alignment tabs 71 are aligned with and received within the alignment notches 54. The alignment tabs 71 and the alignment notches 54 assure proper alignment of the connectors 62 and 64 within the apertures 50, 52. It is noted that the radial location of the notches 54 about the associated apertures 50, 52 may be varied to account for and better support loads exerted on the connection assembly 58. For example, as illustrated in FIGS. 3 and 4, the arm portion 74 (FIG. 7) of the first connector 62 of the upper trailing arm connection assembly 60 is positioned forwardly of the associated pin member 82, while the arm portion 74 of the first connector 62 of the lower trailing arm connection assembly 58 is positioned rearward of the associated pin member 82. While the alignment tab 71 and alignment notches 54 are an example of a configuration that prevents misalignment of the connectors 62, 64 with the mounting bracket 24, other configurations requiring proper assembly may also be utilized. The connectors 62, 64 are inserted into the apertures 50, 52 until the bottom wall 70 of the connectors 62, 64 abut the mounting flange 48 and the body portion 44, respectively. In the illustrated example, the connectors 62, 64 are welded to the mounting bracket 24, however, other suitable connections may also be utilized. The bushing member 78 is positioned within an open end of the lower trailing arm 32 and the central aperture 80 of the bushing member 78 aligned with the apertures 72 of the connectors 62, 64 connected with the mounting bracket 24. The pin member 82 is then inserted into the apertures 72 of the connectors 62, 64 and the central aperture 80 of the bushing member 78, such that the first aperture 84 and the second aperture 86 of the pin member 82 are aligned with the apertures 76 of the first connector 62 and the second connector 64, respectively. Mechanical fasteners, such as bolts 90 are then inserted into the apertures 76 of the connectors 62, 64 and the apertures 84, 86 of the pin member 82. In the illustrated example the apertures 76 of each of the connectors 62, 64 is threaded, however, it is noted that the apertures 84, 86 of the pin member 82 may be threaded along with or in place of the apertures 76 being threaded.

The reference 56a generally designates an alternative embodiment of the trailing arm connection assembly. Since the trailing arm connection assembly 56a is similar to the previously described trailing arm connection assembly 56, similar parts appearing in FIGS. 4-7 and FIG. 8 are represented by the same, corresponding reference numeral, except for the suffix "a" in the numerals of the latter. In the illustrated example, the lower trailing arm connection assembly 58a of the trailing arm connection assembly 56 includes a pin member 82a having a flat abutment surface 100, while the arm portion 74a of the first connector 62a includes a corresponding flat abutment surface 102. In assembly, the bolt 90a extends through the aperture of the arm portion 74a of the first connector 62a and the aperture of the pin member 82a and engages a nut 104 such that the abutment surfaces 100, 102 are held against one another. One or more shim members 106 may be positioned between the abutment surfaces 100, 102 thereby adjusting the fore-and-aft alignment of the trailing arm 32a in the directions 110.

The embodiments of the vehicle suspension arrangement as shown and described herein provide a relatively uncomplicated design for connecting a trailing arm of the suspension arrangement with other elements of the suspension arrangement, may be easily and quickly assembled without the use of specialized tools, is economical to manufacture, is capable of being used across various suspension platforms, is capable of a long operating life, and is particularly well adapted for the proposed use. These embodiments further allow integration of one half of a bar-pin or pin member casting connection into a stamped clevis wall, a bar-pin casting that allows for a load optimization orientation, a connection arrangement that may be configured to prevent incorrect alignment between components, a bar-pin that may be tapped or machined to accept standard fasteners, may include elastomeric bushings that transmit load forces from the trailing arm to the associated bar-pin while absorbing vibration and noise, allow for unlimited rotational movement while limiting or preventing bushing wind-up, and may be configured for both fixed and alignment adjustment applications.

In the foregoing description, it will be readily appreciated by those skilled in the art that modifications may be made to the embodiments as disclosed herein without departing from the concepts as disclosed herein. Such modifications are to be considered as included in the following claims, and unless these claims by their language expressly state otherwise.

The invention claimed is:

1. A vehicle suspension arrangement, comprising:
a mounting bracket configured to be secured to a vehicle frame member;
a trailing arm having a first end and a second end;
an air spring assembly configured to bias the second end of the trailing arm from the vehicle frame member;
an axle assembly coupled to the trailing arm along a length thereof; and
a trailing arm connection assembly pivotably coupling the first end of the of the trailing arm to the mounting bracket, the trailing arm connection assembly comprising:
a first connector having a first portion received within a first aperture of the mounting bracket, and a second portion extending outwardly from the first portion and including an aperture;
a bushing member received within the first end of the trailing arm;
a pin member received within the bushing member and including a first aperture; and
a first mechanical fastener received within the first aperture of the pin member and within the aperture of the second portion of the first connector, thereby pivotably securing the trailing arm to the mounting bracket
wherein the first connector engages the mounting bracket such that the first connector is prevented from rotating with respect to the mounting bracket.

2. The vehicle suspension arrangement of claim 1, wherein at least one of the aperture of the second portion of the first connector and the aperture of the pin member is threaded.

3. The vehicle suspension arrangement of claim 1, wherein the mechanical fastener includes a bolt.

4. The vehicle suspension arrangement of claim 1, wherein the first portion of the connector is cylindrically-shaped.

5. The vehicle suspension arrangement of claim 4, wherein the first connector includes a first engagement portion and the mounting bracket includes a second engagement portion that prevents misalignment of the first connector with respect to the mounting bracket during assembly.

6. The vehicle suspension arrangement of claim 5, wherein the first engagement portion includes a tab and the second engagement portion includes a relief.

7. The vehicle suspension arrangement of claim 1, wherein the first connector is welded to the mounting bracket.

8. The vehicle suspension arrangement of claim 1, wherein the trailing arm connection assembly further comprises a second connector having a first portion received within a second aperture of the mounting bracket, and a second portion extending outwardly from the first portion of the second connector and including an second aperture, the pin member including a second aperture, and a second mechanical fastener received within the second aperture of the pin member and within the aperture of the second portion of the second connector.

9. The vehicle suspension arrangement of claim 8, wherein the second portion of the first connector extends only partially about a circumference of the first connector, the second portion of the second connector extends only partially about a circumference of the second connector, and wherein the second portion of the first connector is rotationally offset from the second portion of the second connector about a longitudinal axis of the pin member.

10. The vehicle suspension arrangement of claim 1, wherein the pin member includes a circular cross-sectional configuration.

11. A vehicle suspension arrangement, comprising:
a mounting bracket configured to be secured to a vehicle frame member;
a trailing arm having a first end and a second end;
an air spring assembly configured to bias the second end of the trailing arm from the vehicle frame member;
an axle assembly coupled to the trailing arm along a length thereof; and
a trailing arm connection assembly pivotably coupling the first end of the of the trailing arm to the mounting bracket, the first trailing arm connection assembly comprising:
a first connector having a cylindrically-shaped first portion received within a first aperture of the mounting bracket, and a second portion extending outwardly from the first portion and including an aperture;
a second connector having a cylindrically-shaped first portion received within a second aperture of the mounting bracket, and a second portion extending outwardly from the first portion of the second connector and including an aperture;
a bushing member received within the first end of the trailing arm;
a pin member received within the bushing member and including a first aperture located proximate a first end of the pin member and a second aperture located proximate a second end of the pin member;
a first mechanical fastener received within the first aperture of the pin member and within the aperture of the second portion of the first connector, and a second mechanical fastener received within the second aperture of the pin member and within the aperture of the second portion of the second connector, thereby pivotably securing the trailing arm to the mounting bracket; and
wherein the first and second connectors each engage the mounting bracket such that both the first and the second connectors are prevented from rotating with respect to the mounting bracket.

12. The vehicle suspension arrangement of claim 11, wherein at least one of the aperture of the second portion of the first connector and the first aperture of the pin member is threaded.

13. The vehicle suspension arrangement of claim 11, wherein the first mechanical fastener includes a bolt.

14. The vehicle suspension arrangement of claim 11, wherein the first connector includes a first engagement portion and the mounting bracket includes a second engagement portion the prevents misalignment of the first connector with respect to the mounting bracket during assembly.

15. The vehicle suspension arrangement of claim 14, wherein the first engagement portion includes a tab and the second engagement portion includes a relief.

16. The vehicle suspension arrangement of claim 11, wherein the first connector is welded to the mounting bracket.

17. The vehicle suspension arrangement of claim 16, wherein the second portion of the first connector extends only partially about a circumference of the first connector, the second portion of the second connector extends only partially about a circumference of the second connector, and wherein the second portion of the first connector is rotationally offset from the second portion of the second connector about a longitudinal axis of the pin member.

18. The vehicle suspension arrangement of claim 11, wherein the pin member includes a circular cross-sectional configuration.

19. A connector assembly, comprising:
a connector member configured to pivotably couple a vehicle suspension component to a mounting structure of a vehicle suspension arrangement, comprising:
a cylindrically-shaped first portion configured to be received within an aperture of a mounting structure, the first portion including a longitudinally extending bore;
an arm portion extending in an axial direction from the first portion and including an aperture configured to receive a mechanical fastener therein; and
at least one tab member extending radially outward from the first portion, wherein the at least one tab member is configured to be received within a notch of the aperture of the mounting structure thereby preventing misalignment of the connector member with the mounting structure;
a pin member received within the bore of the first portion of the connector member and includes an aperture; and
a first mechanical fastener received within the aperture of the pin member and within the aperture of the arm portion of the connector member.

20. The connector assembly of claim 19, wherein the at least one tab member includes a pair of tab members located on opposite sides of the first portion from one another.

21. The connector assembly of claim 19, wherein the aperture of the first portion is threaded.

22. The connector assembly of claim 19, further comprising:
a bushing member including an aperture that receives the pin member.

23. The connector assembly of claim 19, wherein at least one of the aperture of the pin member and the aperture of the arm portion of the connector member is threaded.

24. The connector assembly of claim 19, wherein the mounting structure includes a mounting bracket configured to be secured to a vehicle frame member.

25. A vehicle suspension arrangement, comprising:
a mounting bracket having a substantially planar first portion that includes a first aperture and a substantially planar second portion that includes a second aperture that is substantially parallel with the first portion;
a suspension component having a first end and a second end; and
a suspension component connection assembly pivotably coupling the first end of the of the suspension component to the mounting bracket, the suspension component connection assembly including a first connector assembly that includes a first connector having a first portion received within the first aperture of the mounting bracket, and a second portion extending outwardly from the first portion and including an aperture, wherein the second portion extends only partially about a circumference of the first connector;
a bushing member received within the first end of the suspension component;
a pin member received within the bushing member and including a first aperture; and
a first mechanical fastener received within the first aperture of the pin member and within the aperture of the second portion of the first connector, thereby pivotably securing the suspension component to the mounting bracket.

26. The vehicle suspension arrangement of claim 25, wherein at least one of the aperture of the second portion of the first connector and the aperture of the pin member is threaded.

27. The vehicle suspension arrangement of claim 25, wherein the mounting bracket is configured to be secured to a vehicle frame.

28. The vehicle suspension arrangement of claim 27, wherein the suspension component includes a trailing arm; and
the vehicle suspension arrangement further comprising:
an air spring configured to bias the second end from a vehicle frame member; and
an axle assembly coupled to the trailing arm along a length thereof.

29. The vehicle suspension arrangement of claim 25, wherein the suspension component connection assembly further comprises a second connector assembly that includes a first portion received within the second aperture of the mounting bracket, and a second portion extending outwardly from the first portion of the second connector and including an second aperture, the pin member including a second aperture, and a second mechanical fastener received within the second aperture of the second pin member and within the aperture of the second portion of the second connector.

* * * * *

UNITED STATES PATENT AND TRADEMARK OFFICE
CERTIFICATE OF CORRECTION

PATENT NO. : 11,117,433 B2
APPLICATION NO. : 16/272530
DATED : September 14, 2021
INVENTOR(S) : Johnson et al.

It is certified that error appears in the above-identified patent and that said Letters Patent is hereby corrected as shown below:

In the Specification

Column 1, Line 24:
Delete "of the" (2$^{nd}$ occurrence)

Column 1, Line 44:
Delete "of the" (2$^{nd}$ occurrence)

In the Claims

Column 5, Claim 1, Line 44:
After "bracket" insert -- ; and --

Column 6, Claim 8, Line 6:
"an" should be – a –

Column 6, Claim 11, Line 31:
Delete "of the" (2$^{nd}$ occurrence)

Column 7, Claim 14, Line 4:
"the" (1$^{st}$ occurrence) should be – that –

Column 7, Claim 19, Line 32:
Delete "and"

Column 7, Claim 19, Line 40:
"includes" should be – including –

Column 8, Claim 25, Line 10:
Delete "and"

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*

Column 8, Claim 25, Line 12:
Delete "of the" (2nd occurrence)

Column 8, Claim 29, Line 51:
"an" should be – a –